Figure 1:
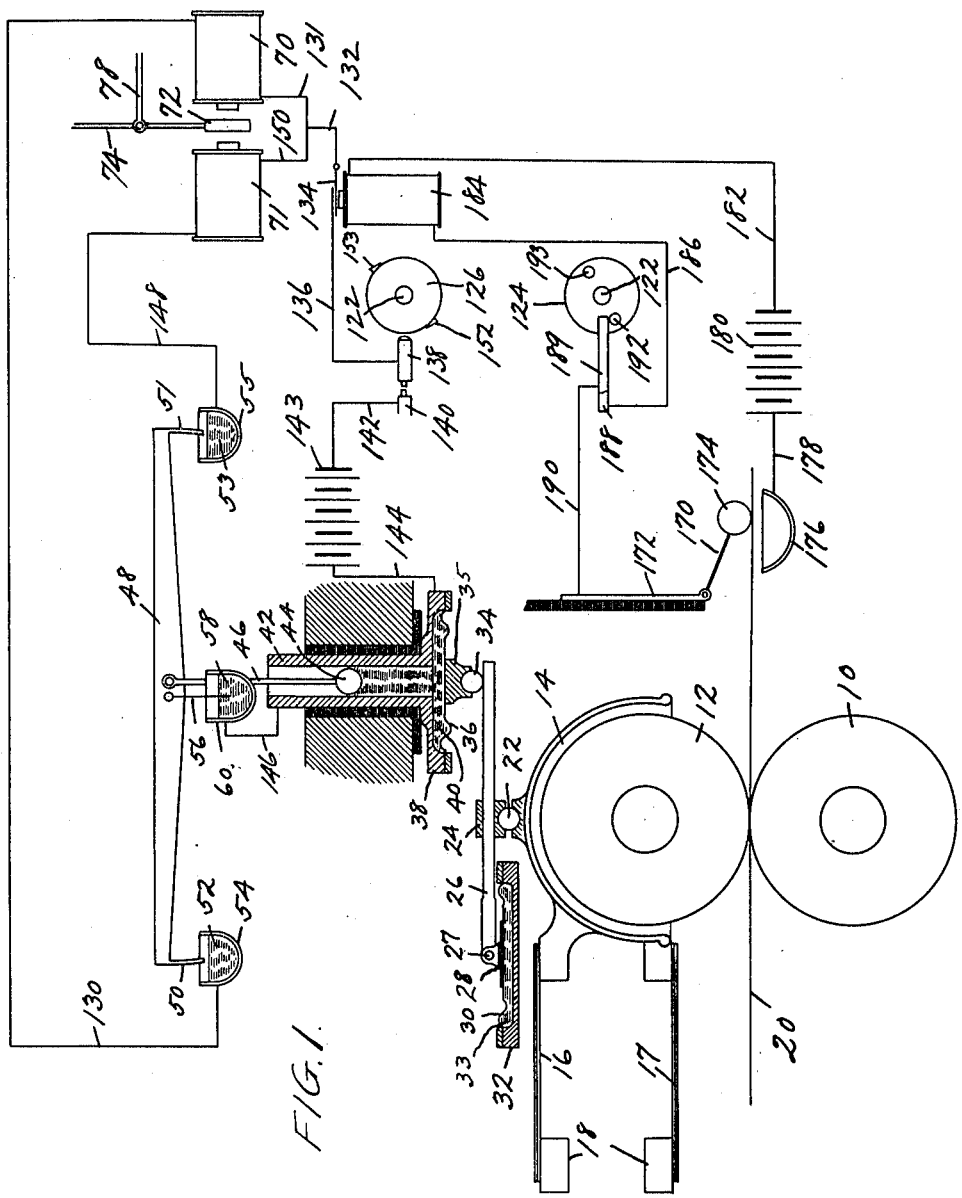

T. FRENCH.
STOCK GATE CONTROLLER FOR PAPER MAKING MACHINES.
APPLICATION FILED SEPT. 19, 1913.

1,140,029.

Patented May 18, 1915.
3 SHEETS—SHEET 1.

WITNESSES:
Charles B Churchill
Edith M. Cabot

INVENTOR.
Tom French
BY Chas F Howe
ATTORNEY.

T. FRENCH.
STOCK GATE CONTROLLER FOR PAPER MAKING MACHINES.
APPLICATION FILED SEPT. 19, 1913.
1,140,029.
Patented May 18, 1915.
3 SHEETS—SHEET 2.
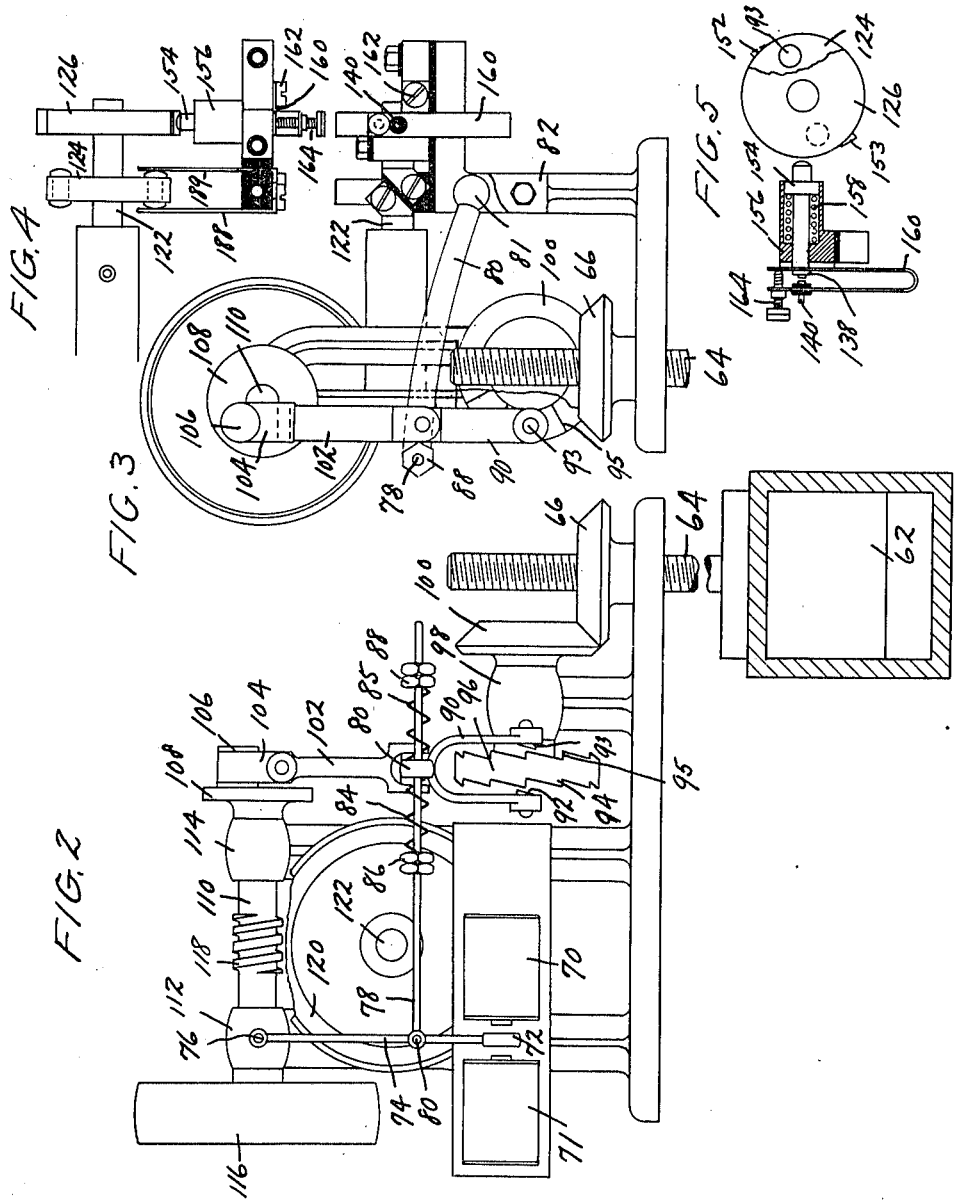
WITNESSES:
Charles P Churchill
Edith M. Cabot
INVENTOR.
Tom French.
BY Chas. F. How
ATTORNEY.

T. FRENCH.
STOCK GATE CONTROLLER FOR PAPER MAKING MACHINES.
APPLICATION FILED SEPT. 19, 1913.
1,140,029.
Patented May 18, 1915.
3 SHEETS—SHEET 3.
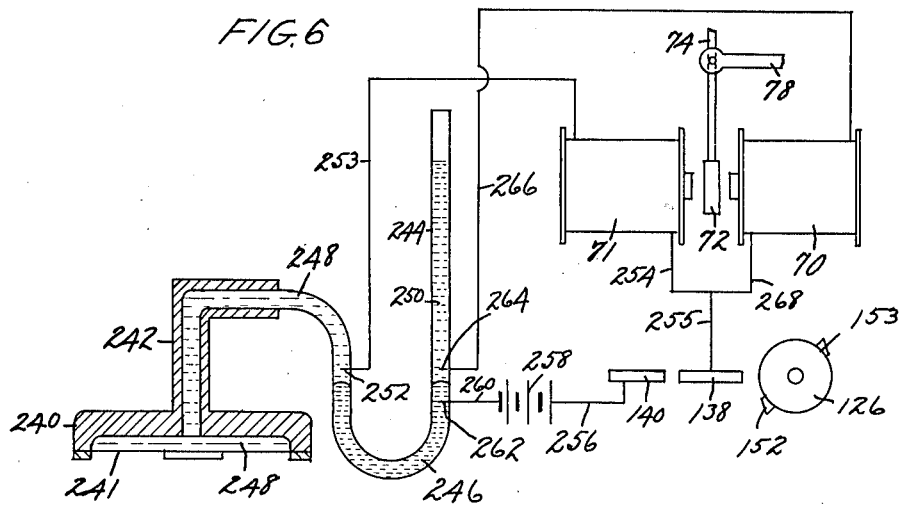
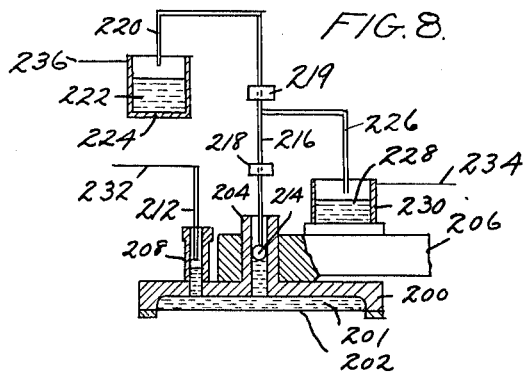
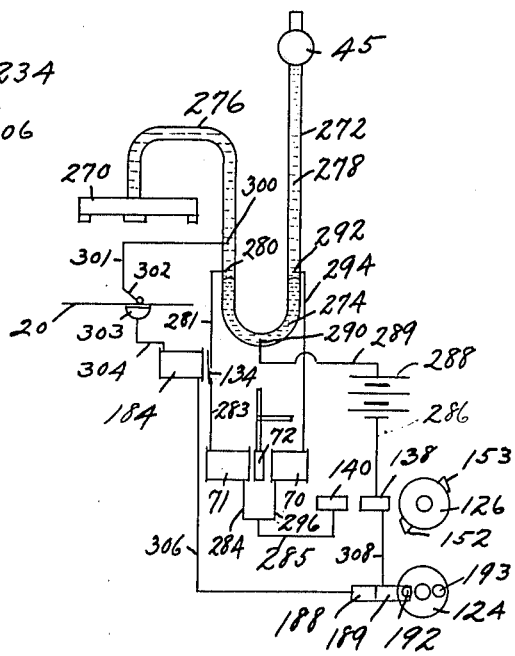
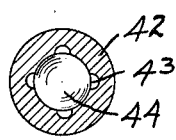
WITNESSES:
INVENTOR.
BY
ATTORNEY

UNITED STATES PATENT OFFICE.

TOM FRENCH, OF RUMFORD, MAINE, ASSIGNOR OF ONE-THIRD TO FRED J. LATHAN AND ONE-THIRD TO JAMES W. HARRIS, BOTH OF RUMFORD, MAINE.

STOCK-GATE CONTROLLER FOR PAPER-MAKING MACHINES.

1,140,029.                Specification of Letters Patent.         Patented May 18, 1915.

Application filed September 19, 1913. Serial No. 790,787.

*To all whom it may concern:*

Be it known that I, TOM FRENCH, residing at Rumford, in the county of Oxford and State of Maine, have invented new and useful Improvements in Stock-Gate Controllers for Paper-Making Machines, of which the following is a specification.

This invention relates to the manufacture of paper and more particularly to a means for controlling the thickness and weight of paper during the process of manufacture.

In the ordinary process of manufacturing paper the weight and thickness are governed by the quantity of stock admitted to the machine, and also by the speed at which the machine is running.

In practice it is difficult to maintain a uniform weight and thickness of paper, due to the variation in the amount of stock admitted to the machine, and to the variations in the speed at which the machine runs. As heretofore ordinarily practised the thickness and weight are determined by cutting out a sheet containing a certain number of square inches and then weighing it. If it is found that the weight does not correspond to the required weight then the machine tender increases or decreases the amount of stock admitted to the machine as the case requires.

Accordingly, the object of this invention is to provide a device which automatically regulates the thickness and weight of paper during the process of manufacture.

With the above object in view the invention contemplates the provision of means for automatically controlling the stock-gate to regulate the feeding of the stock to the paper making machine, according to the thickness of the paper.

The present illustrative embodiment of the invention contemplates the provision of self-adjusting means adapted to engage the web of paper and coöperating with a liquid which controls the operation of means, preferably electro-responsive means, arranged to control the actuation of the stock-gate to regulate the amount of stock delivered to the paper making machine.

The invention will be clearly understood from an inspection of the accompanying drawings, in which—

Figure 1 is a diagrammatic view of an apparatus embodying the invention, Fig. 2 is a front elevation of the mechanism which actuates the stock gate, Fig. 3 is an end elevation of the same, Fig. 4 is a fragmentary plan view of the timing devices for controlling the circuits, Fig. 5 is a sectional side elevation of the same, Figs. 6, 7 and 8 are diagrammatic views of modified forms of the controlling and indicating mechanism, and Fig. 9 is a detail cross-section of the tube which contains the float.

In the illustrative embodiment of the invention shown in the drawings a pair of rollers 10, 12 are employed, one of which is movable radially with respect to the other. As shown, the roller 10 is stationary but journaled in suitable bearings, and the roller 12 is journaled in a frame 14, mounted upon yielding arms 16, 17 secured to any suitable frame or support 18. The roller 12 may be the so-called spring roll of a paper machine or the press roll or finishing roll, although it may be any other suitable roll or device for yieldingly engaging the paper sheet 20. This sheet, where it engages the rollers 10 and 12, has already been passed through sufficient sets of pressing rolls so that it is firm and hard and capable of sustaining a very heavy pressure without compression.

The frame 14 is preferably provided with a ball 22, which is confined within a casing 24, connected to a lever 26 fulcrumed at 27 in a bracket 28 supported on a diaphragm 30. The diaphragm 30 is carried by a diaphragm chamber 32 and secured in place thereon in any suitable manner, and, in the present instance, said chamber is filled with a liquid, 33, preferably mercury.

The lever 26 engages a ball 34 carried by a casing 35 which is mounted on the under side of a diaphragm 36. The diaphragm 36 is carried by a diaphragm chamber 38 and secured in place thereon in any suitable manner, and said chamber is filled with a liquid 40, like that in chamber 32. A tube 42 extends upwardly from the diaphragm chamber 38 and communicates therewith.

A ball 44 loosely fits the inside of the tube 42 and rests upon the liquid 40 therein. As shown in Fig. 9 the tube 42 is provided with internal flutes or channels 43, which enable the mercury, or other liquid, to pass by the ball float 44, when a sudden blow is given to the diaphragm 36, as when a bunch of pulp or any other thick object passes between the rolls 10, 12. This tube is also preferably provided with an enlargement or bulb 45, as shown in Fig. 7, to catch the liquid which is shot up past the ball by the sudden increase in pressure against the diaphragm 36. The ball 44 is secured to the lower end of a rod 46, the upper end of which is pivotally connected to a pivoted beam 48. This beam is fulcrumed so as to be balanced, and is preferably of light metal construction to reduce its inertia and render the device sensitive. The ends of the beam 48 are provided with contact-members 50, 51 which are adapted to dip into mercury 52, 53 contained in cups 54, 55 respectively, and a central contact-member 56, is affixed to the beam 48 and enters the mercury 58 in a cup 60. The contact-member 56 is preferably in the form of a blade or vane so that it may have a damping action on the beam 48 as the former moves through the mercury 58. The contact-members 50, 51 are normally out of contact with the mercury in their respective cups, and this is the case when the thickness of the paper web 20 is running evenly and correctly.

The paper stock is fed to the paper making machine through a stock-gate 62, which regulates the amount of stock applied upon the machine. The weight and thickness of paper depend upon the consistency of the stock, the amount which is fed through the gate, and the speed at which the machine is run. The stock is fed with a substantially constant head through the stock-gate, but its consistency often varies, and the speed of the machine may vary through various causes. After the paper is formed, and preferably after it has passed through several sets of pressing rolls, it passes between the rolls 10, 12, and the position of the upper roll varies with the thickness of the paper.

The two diaphragm chambers 32 and 38 are oppositely disposed so as to counteract the expansion and contraction of the liquids therein due to changes in temperature, and the ball 22 is located at a point on the lever 26, which is equidistant from the points at which the force of the diaphragms 30 and 36 is applied to said lever.

The operation of this mechanism is such that the expansion or contraction of the liquid due to temperature changes is compensated by the oppositely actuated diaphragms, and the upward or downward movement of the ball 22 at the central point is not affected thereby, consequently, any movement of this ball, or the middle point of the lever 26, is transmitted to the liquid in the diaphragm chamber 38 and thereby moves the ball 44 accordingly. It will be observed that the area of the diaphragm 36 is much greater than the bore of the tube 42, hence any movement of the roll 12 and a consequent movement of said diaphragm, due to variations in thickness of the paper sheet 20 passing between the rolls 10 and 12, will be greatly magnified in the tube, thus causing the upper surface of the liquid therein to vary accordingly, thereby raising or lowering the ball 44.

As shown, the stock-gate 62 is provided with a screw-threaded stem 64 which passes through a correspondingly threaded bevel gear 66, whereby the rotation of the latter varies the position of said gate to regulate the amount of stock discharged therethrough. The actuation of said gate is controlled by a pair of electromagnets 70, 71 which are oppositely disposed and have a common armature 72, carried by a rod 74 pivoted at 76. A rod 78 is pivotally connected at one end to the rod 74 and its other end is slidably mounted in a lever 80, having a spherical end 81 suitably mounted in a frame 82, to provide a ball and socket joint. A pair of springs 84, 85 are coiled about the rod 78, and their inner or adjacent ends engage the lever 80, and their outer ends engage nuts 86, 88, respectively.

Depending from the lever 80, at the end through which the rod 78 passes, is a yoke 90, provided with a pair of inwardly projecting dogs 92, 93 adapted to engage the teeth 94, 95, respectively, on the opposite sides of a double-faced ratchet wheel 96, the engagement of said dogs and teeth being dependent upon the position of the armature 72. The ratchet wheel 96 is fast on one end of a shaft journaled in a bearing 98, and a bevel gear 100 is fast on the other end of said shaft and meshes with the bevel gear 66.

The lever 80 is supported in the lower end of a connecting rod 102, which is pivotally connected at its upper end to a block 104, the latter being pivotally mounted on a crank pin 106, carried by a crank disk 108 on a worm shaft 110, journaled in bearings 112, 114.

The shaft 110 is provided with a driving pulley 116, and with a worm 118, which meshes with a worm wheel 120 on a shaft 122. The rotation of the shaft 110 causes the yoke 90 to be reciprocated and oscillated, and it also causes the shaft 122 to be rotated, said shaft 122 being provided with a pair of timing devices 124, 126, to be hereinafter described.

The mercury cup 54 is connected by a wire 130 to the magnet coil 70, and said coil is connected by wires 131, 132 to one pole of a switch 134, and the other pole of said switch is connected by a wire 136 to a contact 138. An oppositely disposed contact 140 is connected by a wire 142 to one pole of a battery 143, and the other pole of said battery is connected by a wire 144 to the diaphragm chamber 38. The contacts 138 and 140 coöperate with the timing device 126. The tube 42 is connected by a wire 146 with the mercury cup 60. The mercury cup 55 is connected by a wire 148 with the magnet coil 71 and said coil is connected by a wire 150 to the wire 132.

The timing device 126 comprises a disk fast on the shaft 122 and provided with diametrically opposed cam surfaces 152, 153 which project radially and are adapted to engage a plunger 154, slidably mounted in a casing 156, and normally pressed outward by a coiled spring 158. The inner end of the plunger 154 is adapted to engage one leg of a U-shaped spring plate 160 having a contact 138 and connected to the wire 136 through a binding post 162. The other leg of the U-shaped spring plate 160 carries a contact 140, insulated therefrom, and also an adjusting screw 164 by which the distance between the contacts 138 and 140 can be regulated. The angularity of the cams 152 and 153 is determined by the length of time that it is desired to maintain the circuit closed through the particular magnet which is energized, thus determining the amount of regulation which shall be done by the stock gate 62, as will be more fully explained.

The operation of the parts so far described is as follows:—The liquid paper stock is fed to the paper making machine through the stock-gate 62, and after a time passes between rollers where it is pressed so as to be firm and capable of resisting a considerable pressure. When the paper has reached this stage in its manufacture it is passed between the rolls 10, 12, which may be located at any convenient point. In place of the rolls, any suitable means for engaging the paper and automatically transmitting pressure to the diaphragm chamber may be employed, but said rolls are preferably employed. The parts are so adjusted that when the paper made is of the correct thickness, the beam 48 is balanced and the electromagnets 70, 71 are deënergized. If, for example, the paper becomes thinner than required, due to a change in the amount or consistency of the stock delivered or in the speed of the paper machine, or for any other reason, the roll 12 is lowered accordingly, thus causing the diaphragm 36 to be lowered and consequently the upper surface of the liquid 40 is lowered, but in a greatly magnified degree. Thus the ball 44 is lowered, and the right hand end of the beam 48 is drawn down to immerse the contact 51 in the mercury 53. As the timer 126 rotates, its cams 152, 153 engage the movable contact-member 138 and move it into contact with the stationary contact-member 140, thereby closing the circuit through the magnet coil 71, it being understood that the switch 134 is normally held closed. When the coil 71 is energized, the armature 72 is drawn toward the left, and the dog 93 is brought into engagement with the ratchet teeth 95. The yoke 90 is reciprocated by the shaft 110, the latter rotating in a counter-clockwise direction as indicated by the arrow in Fig. 2. Thus the downward movement of the yoke 90 rotates the bevel gears 100 and 66 in a direction to cause the stock-gate 62 to be raised to admit more stock to the paper machine. The length of the interval during which the circuit through the magnet 71 is closed, is determined by the timer 126, and this determines how many teeth the ratchet 96 is fed forward. Each operative interval of the timer is of such duration as to allow the stock to go from the gate to the rolls 10, 12, and this interval is determined by the angularity and length of contact of the beveled ends of the cams 152, 153. So long as the paper sheet remains below the required thickness the contact 51 will remain in engagement with the mercury 53, so that the timer 126 will periodically close the circuit at the contacts 138 and 140. When the stock-gate has been opened sufficiently to admit the required amount of stock to the paper machine to bring the resulting web up to the required thickness, the roll 12 is accordingly raised by said web and the balance restored at the beam 48, thus withdrawing the contact 51 from the mercury and preventing further closure of the circuit through the magnet 71, although the timer 126 continues to periodically move the contact 138 into engagement with the contact 140. Thereupon the armature 72 is restored to neutral position by the springs 84, 85 and the dog 93 ceases to engage the ratchet teeth 95. The stock-gate therefore remains in its adjusted position until a change in the thickness of the web 20 again occurs. If the web again becomes too thin, the cycle of operations above described is repeated. If the web becomes too thick, the roll 12 is raised and with it the surface of the liquid 40 and the ball 44, thereby lowering the left-hand end of the beam 48 and immersing the contact 50 in the mercury 52. Thereupon the circuit through the magnet 70 will be periodically closed by the timer 126, and the armature 72 swung to the right together with the yoke 90, so that the dog 92 will engage the ratchet teeth 94 on the upward stroke of said yoke to turn the gears 100 and 66 in the direction necessary to lower the gate 62. And these operations continue until the web 20 is of the required thickness.

Frequently it is necessary to change the thickness of the paper produced, as for example, a lot weighing, say, 30 pounds to the ream is produced one day, the next day paper weighing 40 pounds to the ream is produced, and the following day 30 pound paper is to be again produced. In order to set the machine to start up it is merely necessary to insert a piece of the thirty pound paper between the rolls 10, 12 then balance the arm 48. Then when the machine is running, if the gate is not feeding the proper amount of stock to produce this weight of paper, it is automatically regulated as described above.

Occasionally the paper web 20 breaks, and in order to prevent an excessive opening of the stock-gate due to the downward movement of the roll 12, means are provided to periodically open the switch 134 prior to the engagement of the contacts 138 and 140, and this switch is held open until the timer 126 has released the contact 138. A convenient means for accomplishing this result comprises the following instrumentalities: A contact arm 170 is pivoted to a plate 172 and is provided with a weight 174 adapted to bear upon the paper web 20 as the latter moves along, but when said web fails or breaks, the weight falls into engagement with a cup-shaped contact-member 176, which may be filled with mercury if desired. The cup 176 is connected by a wire 178 to one pole of a battery 180, the other pole of which is connected by a wire 182 to the coil of an electromagnet 184, and said coil is connected by a wire 186 to a spring contact-member 188. An oppositely disposed contact-member 189 is connected by a wire 190 to the plate 172. The contact-springs 188 and 189 are adapted to be engaged by contact-plugs 192, 193 mounted in and projecting from the opposite flat faces of the timer disk 124. This timer is fast on the shaft 122 and so set with respect to the timer 126 that the plugs 192, 193 will engage the spring contacts 188, 189 just ahead of the engagement of the contact 138 by the cams 152, 153 of the timer 126. Thus when the contacts 174, 176 are in engagement and the contacts 188, 189 are bridged the coil 184 will be periodically energized just ahead of the engagement of the cams 152, 153, so that the switch 134 will be open when said cams engage the contact-member 138, thereby preventing energization of either of the coils 70, 71 and saving the energy of the battery 143.

From the construction above set forth it will be noted that the thickness of the paper is automatically regulated, the minutest variation in thickness of the web 20 being magnified and operating to control the actuation of the stock-gate.

In Fig. 8 is shown a modified form of contact device, which comprises a diaphragm chamber 200, having a diaphragm 202 secured thereto, and having an upwardly extending portion or tube 204, the latter being held in a support 206. A tube 208 is mounted on the chamber 200 and communicates therewith, and a contact-member 212 is supported within said tube. The diaphragm chamber 200 is filled with a liquid 201 preferably mercury, which extends up into the tubes 204 and 208. A ball float 214 is supported by the liquid in the tube 204, and is carried by the lower end of a wire rod 216 slidably mounted in guides 218, 219. The upper end of the rod 216 is bent at right angles and provided with a depending portion 220, which is adapted to coöperate with a bath of mercury 222 contained in a cup 224. The rod 216 is also provided with a lateral extension or arm 226 having a depending portion which is adapted to coöperate with a bath of mercury 228 contained in a cup 230. The contact 212 is connected by a wire 232 to a magnet coil (such as 70), for controlling the stock-gate to reduce the opening thereof; the cup 230 is connected by a wire 234 to a magnet coil (such as 71), for controlling the stock-gate to open the same; the cup 224 is connected by a wire 236 to a magnet coil (such as 184), for opening the circuits of the magnet coils 70, 71, as heretofore explained.

When the paper becomes too thick the diaphragm 202 is raised, thus causing the liquid 201 to engage the contact 212 and thus control the stock-gate to reduce the amount of stock put upon the paper machine. When the paper becomes too thin the diaphragm 202 is lowered and consequently the ball float 214, and the contact 226 engages the mercury 228 to control the gate to increase the amount of stock fed to the paper machine. When the sheet breaks or fails for any reason, the diaphragm 202 and ball float 214 are lowered sufficiently to bring the contact 220 into engagement with the mercury 222, thereby controlling the circuit through the magnet coil 184, the operation of each of these instrumentalities being substantially the same as heretofore explained.

In Fig. 6 is shown another modified form of contact device, which comprises a diaphragm chamber 240, having a diaphragm 241 secured thereto, and having an upwardly extending portion or tube 242. A U-shaped tube 244, preferably of glass, is open at the upper end of its long leg, and its other leg is connected to the tube 242. The bend of the tube 244 contains mercury 246. The diaphragm chamber 240, the tube 242, and that portion of the left leg of the tube 244, above the mercury 246, contain oil 248, and the right leg of said tube 244 also contains oil 250. Under normal conditions, the mercury 246 should stand at substantially the same height in the two legs of the tube 244. A contact 252 is sealed into the left leg of the tube 244 above the normal level of the mercury therein, and is connected by a wire 253 to the magnet coil 71, and said coil is connected by wires 254, 255 to contact 138, which coöperates with the contact 140. The contact 140 is connected by a wire 256 to a battery 258, and said battery is connected by a wire 260 to a contact 262 sealed into the right leg of the tube 244 below the normal surface of the mercury therein. A contact 264 is sealed into said right leg above the normal surface of the mercury therein, and this contact is connected by a wire 266 to the magnet coil 70, said magnet coil being connected by a wire 268 to the wire 255. In this form of device, when the web 20 becomes too thick the diaphragm 241 is raised and the oil 248 forces the mercury 246 to engage the contact 264. Now when the contacts 138 and 140 are brought into engagement with each other by the timer 126, the coil 70 is energized and the armature 72 is attracted toward the right and controls the stock-gate 62 to reduce the amount of stock fed to the machine, as explained heretofore. If the web 20 becomes thinner than required, the diaphragm 241 is lowered and the oil 250 in the long leg of the tube 244 forces the mercury 246 into engagement with the contact 252, and the contact 264 is immersed in the oil. Now the circuit will be closed through the coil 71, by the timer 126, and the armature 72 swung toward the left to control the stock-gate so that more stock will be supplied to the machine. If the web 20 breaks, or fails for any reason, the diaphragm 241 is lowered to such an extent that the oil 250 in the long leg of the tube 244 will force the mercury 246 in said leg downward to such an extent that the contact-members 262 and 264 will both be immersed in oil, and hence no current will flow through either coil 70, 71 when the contacts 138, 140 are brought into engagement by the timer 126.

In Fig. 7 is shown still another form of contact device, which comprises a diaphragm chamber 270, connected to a U-shaped glass tube 272 open at its upper end and provided with a bulb or catch receptacle 45. It should also be understood that the tubes 204 and 244 may be, and preferably are, provided with similar bulbs or chambers to prevent the liquid in said tubes from squirting out under the action of sudden increases of pressure by the diaphragms, as heretofore explained. The bend of the tube 272 contains mercury, while the chamber 270, the left-hand portion of the tube 272 above the mercury 274 contains oil 276, and the long leg of said tube, contains oil 278. Under normal conditions, the mercury 274 should stand at substantially the same height in both legs of the tube 272. A contact 280 is sealed into the left leg of the tube 272 above the normal level of the mercury therein, and is connected by wire 281, switch 134 and wire 283 to magnet coil 71, and said coil is connected by wires 284, 285 to contact 140, which coöperates with the contact 138 connected by a wire 286 to a battery 288. The battery 288 is connected by a wire 289 to a contact 290 sealed into the tube 272 at the bottom of the bend. A contact 292 is sealed into the right leg of the tube 272, above the normal level of the mercury therein, and this contact is connected by a wire 294 to the magnet coil 70, said coil being connected by a wire 296 to the wire 285. A contact 300 is sealed into the left leg of the tube 272 above the normal level of the mercury 274 therein, and this contact is connected by a wire 301 to a weighted arm 302, which engages the paper web 20 and is supported thereby. A contact-cup 303 is supported opposite the arm 302 below the paper web, and is connected by a wire 304 to a magnet coil 184, and this coil is connected by a wire 306 to a contact-finger 188, which coöperates with an oppositely disposed contact-finger 189, the latter being connected by a wire 308 to the contact-member 138. In this form of the device the operation of the parts is substantially the same as those shown in Fig. 1. When the paper web 20 breaks or fails, the arm 302 engages the cup 303, and the mercury 274 rises to immerse the contact 300. When a plug 192, 193 bridges the contact-fingers 188, 189, the circuit is closed through the coil 184, and the latter opens the switch 134 just in advance of the engagement of the contacts 138, 140, it being understood that the timer 124 is set to operate just ahead of the timer 126, as heretofore explained.

I do not intend that the claims, except where they are limited by their express terms to the specific construction illustrated in the accompanying drawings and described in the foregoing description, should be limited to such construction, as my invention is, I believe, broad and generic in character, and capable of embodiment in a wide variety of forms.

Having thus described my invention I claim as new and desire to secure by Letters Patent:—

1. In a paper making machine the combination of self-adjusting means for engaging a moving web of paper, means for regulating the amount of paper stock fed to said machine, means for controlling the actuation of said regulating means in accordance with the thickness of the paper at said engaging means, and means operative upon the breakage or failure of said web arranged to render said controlling means inoperative.

2. In a paper making machine the combination of self-adjusting means for engaging a moving web of paper, a stock-gate for regulating the amount of paper stock fed to said machine, means for actuating said gate, means for controlling the actuation of said gate in accordance with the thickness of the paper at said engaging means, and means operative upon the breakage or failure of said web arranged to render said controlling means inoperative.

3. The combination of self-adjusting means for engaging a web of paper, a pair of opposed electromagnets, circuit connections by which either of said magnets may be energized according to any variations in the thickness of said web, and means for preventing the energization of either of said magnets when said web fails or breaks.

4. The combination with a stock-gate for regulating the amount of stock fed to a paper making machine, of a shaft operatively connected to said gate to open and close the same, a double-faced ratchet wheel on said shaft, a pair of dogs adapted to engage said ratchet wheel, means for reciprocating said dogs, and means having provision for engaging the paper sheet for controlling the movements of said dogs to cause one or the other to engage said ratchet wheel if the paper varies in thickness, to actuate said stock-gate.

5. The combination with a stock-gate for regulating the amount of stock fed to a paper making machine, of a pair of rolls adapted to engage the paper made on said machine, one of said rolls being self-adjusting, electro-responsive means for controlling the actuation of said gate, contact-members associated with said electro-responsive means, a chamber having one wall adapted to move with said self-adjusting roll, and a fluid contained in said chamber adapted to actuate said contact-members upon the movement of said wall.

6. The combination with a stock-gate for regulating the amount of stock fed to a paper making machine, of self-adjusting means for engaging the paper made on said machine, a pair of electro-magnets for controlling the actuation of said gate, circuit connections whereby either of said electro-magnets may be energized, means operable by said self-adjusting means for placing the circuit through one of said electro-magnets in condition to be closed, when the thickness of said paper varies, and a timing device for periodically closing said circuit.

7. The combination with a stock-gate for regulating the amount of stock fed to a paper making machine, of self-adjusting means for engaging the paper made on said machine, a pair of electromagnets for controlling the actuation of said gate, circuit connections whereby either of said electro-magnets may be energized, means operable by said self-adjusting means for placing the circuit through one of said electro-magnets in condition to be closed when the thickness of the paper varies, a timing-device for periodically closing said circuit, and a timing device set to operate in advance of said first mentioned timing-device to open said circuit in the event that the paper breaks or fails.

8. The combination with a stock-gate for regulating the amount of stock fed to a paper making machine, of means for operating said gate, self-adjusting means engaging the paper made on the machine, a liquid arranged to magnify the movements of said self-adjusting means, and means controlled by said liquid for controlling the actuation of said stock-gate.

9. A paper making machine including a stock-gate, means for operating the gate in either direction, electro-magnetic means for controlling the direction of movement of the gate operating means, means controlled by one characteristic of the paper for governing the electro-magnetic means, and mechanical means operated upon rupture of the paper for preventing energization of the electro-magnetic means under any conditions of operation.

10. A stock-gate controller for paper making machines including mechanical means for actuating the gate, a driving element for operating said mechanical means in either direction, opposing actuators adapted for respectively coöperating with the driving element in accordance with the direction of operation desired, electro-magnetic means selectively coöperating a particular actuator with the driving element, a circuit for said electro-magnetic means, mechanism governed by a characteristic of the paper for controlling said circuit and mechanism governed by another characteristic of the paper for preventing the control of the circuit by the first mentioned paper governed means from operatively affecting the electro-magnetic means.

11. A stock-gate control for paper making machines including a driving mechanism for the stock-gate, a ratchet wheel forming part of said mechanism, opposing dogs to engage and actuate the ratchet in opposite directions, an electro-magnet for selectively actuating a particular dog with relation to the ratchet, a circuit controlling said electro-magnet, means governed by the thickness of the paper for controlling the circuit, a circuit closer included in said circuit and means operative upon the presence of a particular characteristic in the paper for operating the circuit breaker to prevent energization of the electro-magnet through the circuit governing means controlled by the thickness of the paper.

12. A stock-gate control for paper machines including mechanism for actuating the gate in either direction, actuators for driving said mechanism in a particular direction, opposing electro-magnets coöperating with the actuators and adapted in individual energization to select a particular actuator for coöperation with the driving mechanism, a circuit for each electro-magnet, a normally open contact for each circuit, means governed by the thickness of the paper for selecting and closing the particular open contact, a circuit closer controlling both of said circuits, and means operative through a particular characteristic of the paper to actuate the circuit closer to open both of said circuits and thereby prevent electro-magnetic operation of the actuators.

13. The combination with means controlled by a particular characteristic of a web of paper product of a paper making machine, independent electro-magnets, circuit connections by which either of said magnets may be energized, means for controlling said circuit connections through the actuation of the first mentioned means, stock control means normally inoperative, a plurality of actuators for said means adapted to operate the means in reverse directions, all of said actuators being operated upon the energization of either electro-magnet, a particular electro-magnet selecting a particular actuator for driving coöperation with the stock control means, and electro-magnetic means operative through the failure or break of said web of paper for preventing energization of either electro-magnet without regard to the condition of said circuit connections.

14. A paper making machine including a stock feed regulator, electro-responsive means including circuits for governing the direction of operation of said regulator, contact members for each of said circuits, an element simultaneously and oppositely actuating said contact members, a pressure chamber having a flexible wall, a tube rising from and in communication with said chamber, said chamber and tube containing a fluid, a member operatively connected with the element and actuated by the level of the fluid in the tube, and means controlled by a characteristic of the paper web for varying the pressure upon the flexible wall of the chamber and thereby altering the level of the fluid in the tube.

15. A paper making machine including a stock feed regulator, electro-responsive means including circuits for governing the direction of operation of said regulator, contact members for each of said circuits, an element simultaneously and oppositely actuating said contact members, a pressure chamber having a flexible wall, a tube rising from and in communication with said chamber, said chamber and tube containing a fluid, a member operatively connected with the element and actuated by the level of the fluid in the tube, a pair of rolls made to engage the paper web product, one of the rolls being self-adjusting, means actuated by the roll in its adjustment to vary the pressure upon the flexible wall of the chamber.

16. A paper making machine including a stock feed regulator, electro-responsive means including circuits for governing the direction of operation of said regulator, contact members for each of said circuits, an element simultaneously and oppositely actuating said contact members, a pressure chamber having a flexible wall, a tube rising from and in communication with said chamber, said chamber and tube containing a fluid, a member operatively connected with the element and actuated by the level of the fluid in the tube, a pair of rolls made to engage the paper web product, one of the rolls being self-adjusting, means actuated by the roll in its adjustment to vary the pressure upon the flexible wall of the chamber, the surface area of the chamber materially exceeding the same area of the tube to magnify in the level of the indicator in the tube the pressure on the flexible wall of the chamber.

17. A stock control for paper making machines including electro-mechanical means for operating a stock feed, and means governed by a characteristic of the paper web product for selectively actuating said electro-mechanical means to increase or decrease the feed of the stock, said paper controlled means including an element movable by the paper web under particular conditions, a circuit closer for selectively governing the electro-mechanical means, and a fluid body for transferring movement of the paper operated element to the circuit closer.

In testimony whereof I have subscribed my name to this specification in presence of two subscribing witnesses.

TOM FRENCH.

Witnesses:
 RALPH T. PARKER,
 EUNICE L. LYFORD.